United States Patent [19]
Vandenberg et al.

[11] Patent Number: 5,552,594
[45] Date of Patent: Sep. 3, 1996

[54] FOCUS DETECTING SYSTEM USING A BEAM SPLITTER TO FORM AN IMAGE AT NOMINAL BEST FOCUS, SLIGHTLY IN FRONT OF BEST FOCUS AND SLIGHTLY BEHIND BEST FOCUS

[75] Inventors: Donald E. Vandenberg, Brockport; Thomas W. Dey, Springwater; James Olson, Fairport, all of N.Y.

[73] Assignee: Eastman Kodak Company, Rochester, N.Y.

[21] Appl. No.: 388,096

[22] Filed: Feb. 14, 1995

[51] Int. Cl.$^6$ ............................................. G02B 27/40
[52] U.S. Cl. ....................... 250/201.7; 250/204; 359/638; 354/406
[58] Field of Search ............................ 250/201.7, 204; 354/406, 409; 359/635, 638, 640

[56] References Cited

U.S. PATENT DOCUMENTS

| | | | |
|---|---|---|---|
| 4,341,953 | 7/1982 | Sakai et al. | 250/204 |
| 4,557,580 | 12/1985 | Suzuki | 356/406 |
| 4,641,942 | 2/1987 | Sakai et al. | 354/406 |
| 4,650,988 | 3/1987 | Suzuki et al. | 250/216 |
| 4,926,249 | 5/1990 | Ichihara et al. | 358/75 |
| 5,032,004 | 7/1991 | Steinle | 350/171 |
| 5,166,506 | 11/1992 | Fiete et al. | 250/201.7 |
| 5,270,804 | 12/1993 | Lach | 358/62 |
| 5,446,710 | 8/1995 | Gardner et al. | 369/44.14 |

*Primary Examiner*—Edward P. Westin
*Assistant Examiner*—Stephen Calogeno
*Attorney, Agent, or Firm*—Thomas H. Close

[57] ABSTRACT

A focus detecting system for detecting focus state of an image forming optical system relative to an object, includes a beam splitter assembly for forming at least three coplanar two-dimensional images of a scene, each image having a different focus setting. An area array image sensor senses the images at the image forming plane. Signal processing electronics determine the sharpness of the three images and calculates an optimum focus setting for the optical system by deterring the variances of the three images and calculating a position of maximum variance corresponding to a best focus setting of the optical system.

4 Claims, 4 Drawing Sheets

FOCUS DETECTING SYSTEM USING A BEAM SPLITTER TO FORM AN IMAGE AT NOMINAL BEST FOCUS, SLIGHTLY IN FRONT OF BEST FOCUS AND SLIGHTLY BEHIND BEST FOCUS

FIELD OF THE INVENTION

The invention relates generally to the field of photography, and in particular to focus detection in image forming optical systems. More specifically, the invention relates to a focus detecting system of the type wherein image focus is determined by the variance of the image intensity.

BACKGROUND OF THE INVENTION

U.S. Pat. No. 4,341,953, issued Jul. 27, 1982 to Sakai et al. discloses a focus detection system having a plurality of linear image sensing arrays and a beam splitter for forming three images on the arrays, one of which is at nominal best focus, one slightly in front of best focus, and one slightly behind best focus. Signal processing electronics receive the signal from the image sensors and determine a position of best focus as a function of the variance of the intensity of the sensed images. This approach has the draw back that the one dimensional image sensors provide a limited sampling of the image. A larger sampling of the image is desirable since the signal to noise ratio of the focus signal is proportional to the square root of the number of pixels in the sample.

It is also known to use an area array image sensor in a camera and move the lens through its focus range while capturing a number of images. This approach has the advantage over a linear sensor in that the sampled image is inherently more representative of the actual image to be recorded and the focus determination is more accurate due to the larger sampling of the image, however it is not applicable if the image is moving, and the focus sensor has moving parts, which is also undesirable from a reliability standpoint. It would therefore be desirable to employ an area array image sensor in a focus sensor of the type shown by Sakai et al. However, the prism arrangement in Sakai et. does not allow for simultaneous two-dimensional image fields and small focus differentials. If the image sensors in Sakai et al. are spaced apart along the optical axis, as they would be if they were area array sensors, the differences in focus position would be prohibitively large. As shown in FIG. 6, in a focus sensor of the type disclosed by Sakai et al. generally designated 10, having beam splitting prisms 12, 12' and 12" and adapted to employ area array image sensors 14, 14', and 14", if the focus position 16' on the second image sensor 14' is chosen to be near optimum, the focus position 16 on the first image sensor will be too far below the sensor, and the focus position 16" on the third image sensor will be too far above the image sensor 14". In general, for the optical arrangement disclosed by Sakai et al the focus differentials will be roughly equal to two thirds the image sensor spacing if glass prisms are used or one times the image sensor spacing if thin plate beam splitters are used. The desire for large area arrays and small focus differentials are thus mutually exclusive.

SUMMARY OF THE INVENTION

The present invention is directed to overcoming one or more of the problems set forth above. Briefly summarized, according to one aspect of the present invention, a focus detecting system for detecting focus state of an image forming optical system relative to an object, includes a beam splitter assembly for forming at least three coplanar two-dimensional images of a scene, each image having a different focus setting. An area array image sensor senses the images at the image forming plane. Signal processing electronics determine the sharpness of the three images and calculates an optimum focus setting for the optical system by determining the variances of the three images and calculating a position of maximum variance corresponding to a best focus setting of the optical system.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The intent of our invention is to provide an improved optical beam splitter which will simultaneously place three or more relatively large area images, differing by relatively small focus differentials upon a preferably common large photosensitive array. To achieve this, we have replaced the prior art beamsplitter with one which will not suffer the above mentioned mutually exclusive limitations of array size and small focus differentials.

Figure 1:
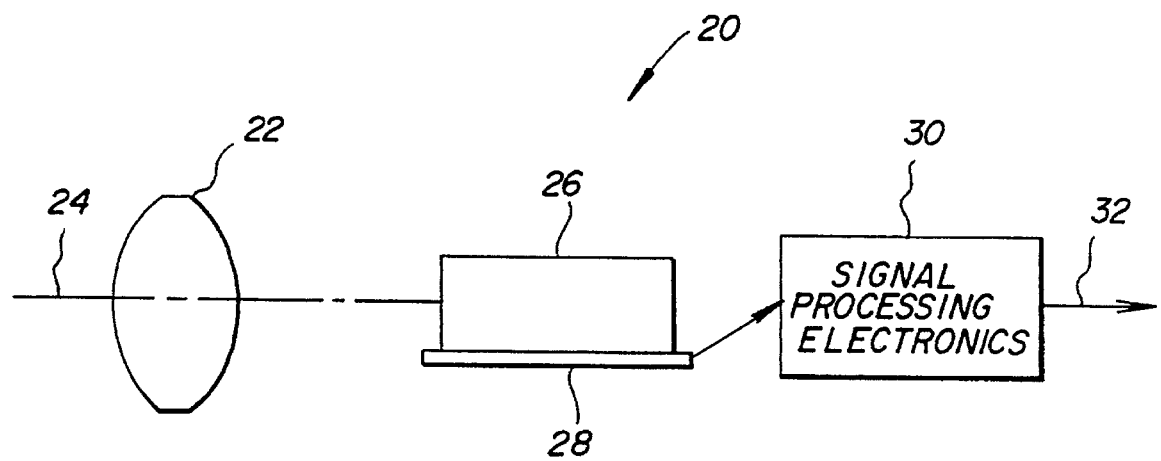
FIG. 1 shows an optical imaging system incorporating a beam splitter assembly which is used to assist in the determination of focus.

To aid in understanding our solution to this problem, please first refer to FIG. 1, which is a schematic representation of a generic imaging system 20, incorporating a beam splitter assembly 26 for determination of focus. The imaging function of the optical system is achieved by use of a lens 22 which is concentric about optical axis 24. The lens serves the purpose of imaging a scene onto photographic film or a solid state image sensor. It is important that the image be well focused so that the most detailed image is recorded. The lens may be a simple single element lens as shown in FIG. 1, a multiple element photographic objective lens, or a telescopic imaging system.

The beam splitter assembly 26 is positioned to intercept a portion of the light passing from an object and through the lens. The beam splitter assembly 26 is preferably on or near the optical axis 24 of the imaging system, so that it receives imaging light most representative of the center of the object to be recorded. This option is available if the optical imaging system 20 is a single lens reflex camera in which a moveable mirror provides access to the image center for viewing and focusing prior to recording. Alternatively, the assembly 26 may be positioned away from the optical axis 24 so that the central image is not obstructed. The beam splitter assembly 26 divides the image it receives into two or more images differing only in focus, and directs them to disjoint regions of an image sensor 28. The image sensor 28 transforms the images into characteristic electronic signals, which pass to signal processing electronics 30. The signal processing electronics 30 determine best focus by comparing the characteristic electronic signals from the various focused and defocused images sensed by image sensor 28. Such signal processing electronics are well known in the prior art, as described for example by the previously referenced Sakai et al. patent. The signal processing electronics 30 produces a focus signal 32 which provides focus information for adjusting the lens 22 for optimum focus either manually or automatically.

Figure 2:
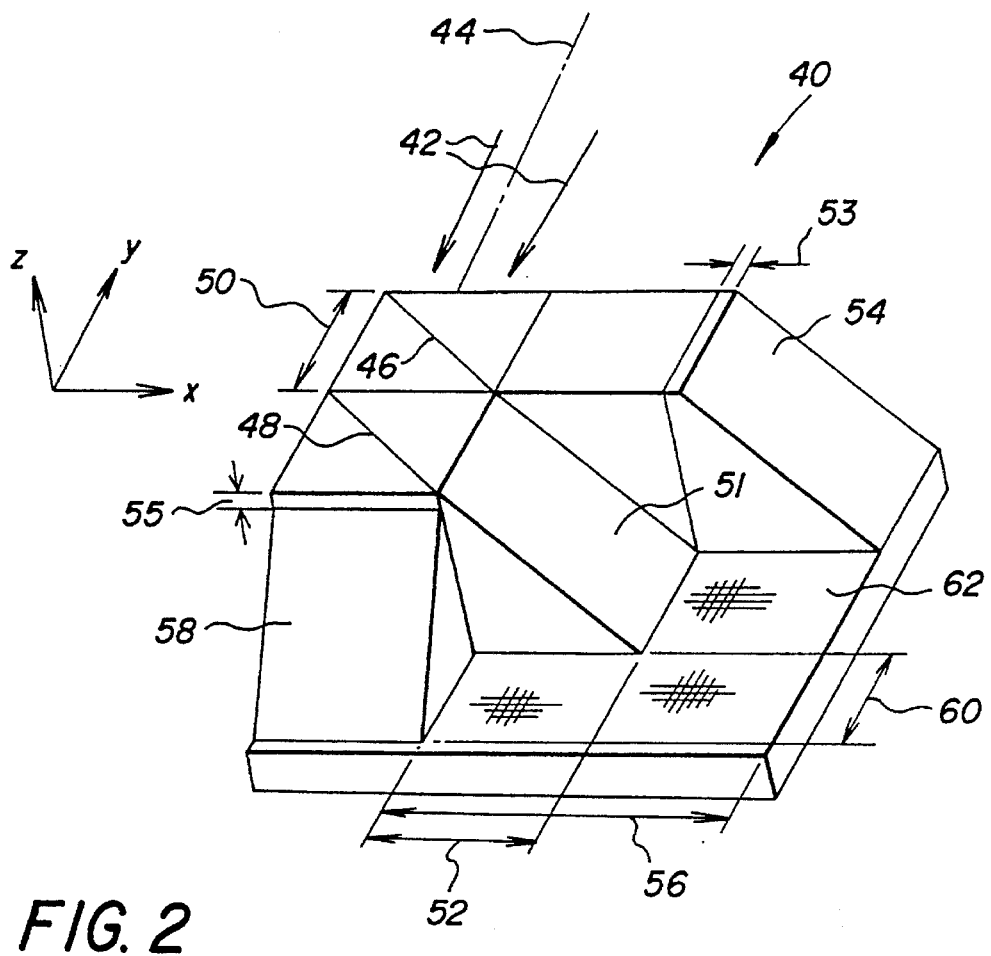
FIG. 2 shows a first configuration for a beam splitter/image sensor assembly according to the present invention.
Figure 3:
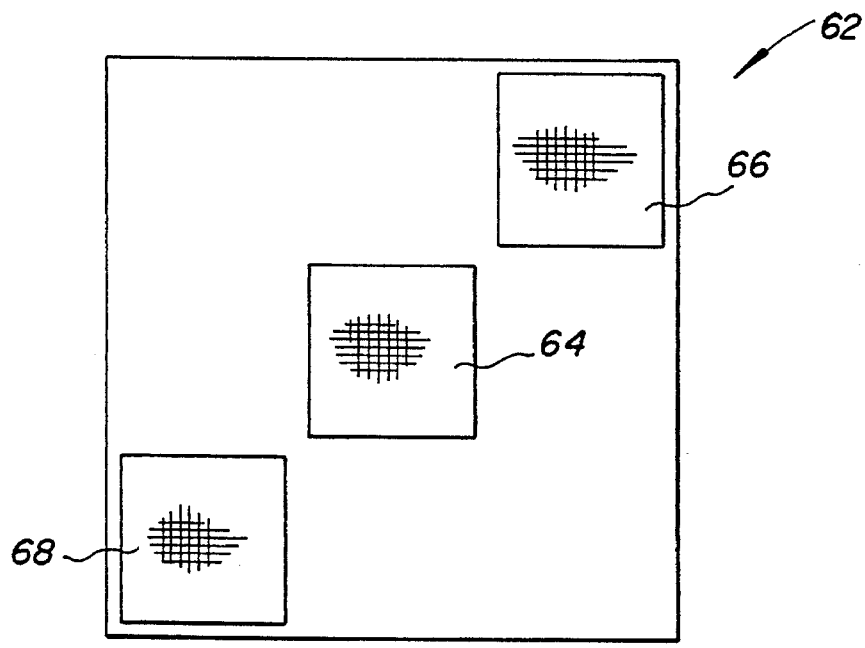
FIG. 3 shows a first area array imaging sensor with focused and defocused regions, as illuminated via the beam splitter assembly of FIG. 2.

A first specific embodiment of a beam splitter/image sensor according to the present invention is shown in FIGS. 2 and 3. FIG. 2 show a beam splitting cluster generally designated 40 mounted on the surface of a two dimensional photosensitive array 62. Following the imaging beam 42, light arrives along optical axis 44, from the y-direction and enters the beam splitting cluster. A first beamsplitter 46 intercepts the imaging beam 44, splitting it into two components. A transmitted component travels in the –y-direction by a first distance 50, whence it encounters a second beamsplitter 48, which further splits the beam into two components. The reflected component travels in the x-direction by a second distance 52, whence it encounters a first mirror 51, which reflects the beam downward in the –z-direction, to form a nominally focused image upon a central region 64 of the photosensitive array 62, as shown in FIG. 3. The beam component reflected from the first beamsplitter 46, proceeds in the x-direction by a third distance 56, whence it encounters a second mirror 54 which reflects the beam downward in the –z-direction to form a defocused image upon a corner region 66 of the photosensitive array 62 (see FIG. 3). The image upon this region of the array is nominally behind focus by a small distance, determined, in part by the difference between the third distance 56 and the sum of the first and second distances 50 and 52. This is achieved by the extra glass thickness 53 shown extending surface 54 in the +x-direction. The beam component transmitted through both beamsplitters 46 and 48 travels in the –z-direction by a fourth distance 60, measured from the second beamsplitter 48, whence it encounters a third mirror 58 which reflects the beam downward in the –z-direction, to form a defocused image upon a corner region 68 (see FIG. 3) of the photosensor array 62. The image formed upon this region of the array 62 is nominally ahead of focus by a small distance, determined, in part, by the difference between the second distance 52 and fourth distance 60. This is achieved by the diminished glass thickness 55 shown displacing surface 58 in the –z-direction.

In this way, three two-dimensional images with controlled shifts in focus are formed on a single two-dimensional photosensor array 62 for the determination of focus of the lens 22. Several advantages incur from using a single two-dimensional photosensor array in this way, as opposed to using three separate photosensor arrays. First, mechanical alignment to maintain the three image sensing areas coplanar to a high degree of accuracy is greatly facilitated. Even more importantly, the electronic signals from the three areas on the single image sensing array are electronically balanced since each group of signal is read out via the identical output electronics. This is a great advantage of the present invention since a slight imbalance in the signals from the separate image areas will be interpreted as a focus shift.

Figure 4:
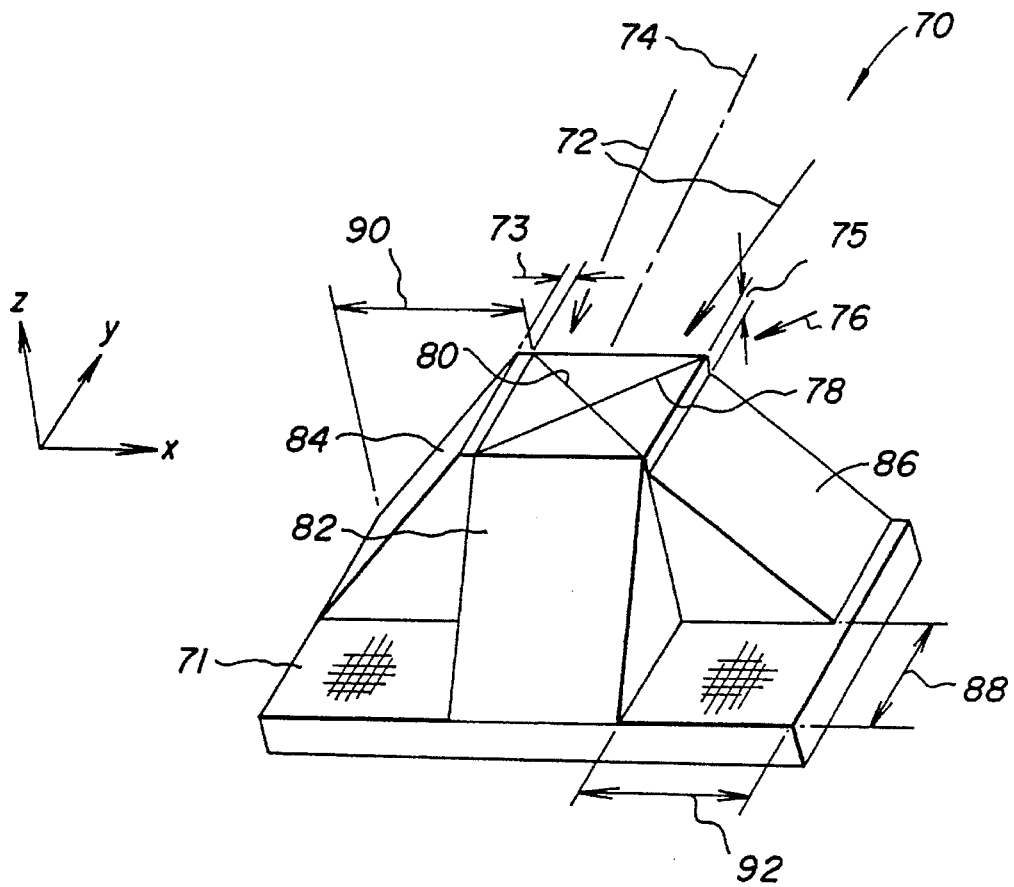
FIG. 4 shows a second configuration for a beam splitter/image sensor assembly according to the present invention.
Figure 5:
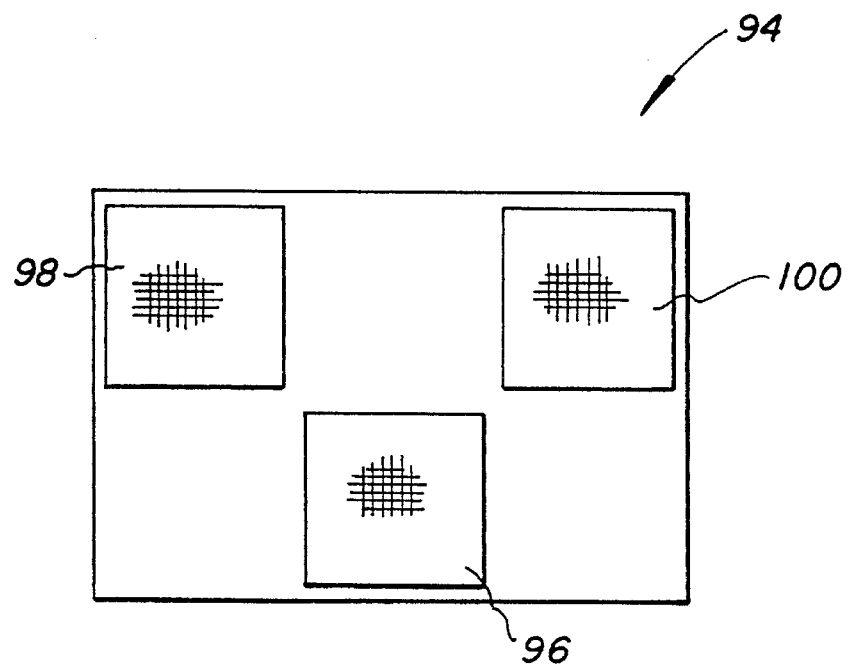
FIG. 5 shows a second area array imaging sensor with focused and defocused regions, as illuminated via the beam splitter assembly of FIG. 4.

A second embodiment of the present invention will now be described with reference to FIGS. 4 and 5. FIG. 4 shows a beam splitting cluster 70 arranged on the surface of a two-dimensional photosensor array 71. Following the imaging beam 72, light arrives along optical axis 74, from the y-direction and enters the cluster 70. A crossed beamsplitter 76, comprising first and second beam splitting surfaces 78 and 80, respectively intercepts the incoming imaging beam 72. The potion of the beam which is transmitted through both beamsplitters travels a first distance 88, whence it encounters a first mirror 82 which reflects the beam downward in the –z-direction, to form a nominally-focused image upon a region 96 of the photosensor array 94, as shown in FIG. 5. The beam component reflected from the first beamsplitter 78, proceeds in the –x-direction by a second distance 90, whence it encounters a second mirror 84 which reflects the beam downward in the –z-direction to form a defocused image upon a corner region 98 of the photosensor array 94 (see FIG. 5). The image formed upon this region of the array is nominally behind focus by a small distance, determined, in part, by the difference between the second distance 90 and the first distance 88. This is achieved by the extra glass thickness 73 shown extending surface 84 in the –x-direction. The beam component reflected from the second beam splitter 80, proceeds in the x-direction by a third distance 92, whence it encounters a third mirror 86 which reflects the beam downward in the –z-direction to form a defocused image upon a corner region 100 of the photosensor array 94 (see FIG. 5). The image formed upon this region 100 of the array 71 is nominally behind focus by a small distance, determined in part by the difference between the first distance 88 and the third distance 92. This is achieved by the diminished glass thickness 75 shown displacing surface 86 in the –z-direction. In this way three two-dimensional images with controlled shifts in focus are formed on a common two-dimensional photosensor array 71 for the determination of focus.

The beam splitting clusters of the two embodiments shown in FIGS. 2–5 may be constructed for example from an assembly of solid glass prisms with beam splitting coatings deposited onto some faces to achieve nominally equal image brightness in each image formed upon the photosensor array. Alternatively, some or most of the glass in the prism cluster may be replaced by air. This is achieved by allowing air gaps between the prisms or by reducing the beam splitting faces to thin plate beam splitters. The overall geometry and principles of operation remain the same. When implementing such variations on the beam splitting cluster, the equations of Table 1 will prove useful. This Table shows the defocus introduced by each of four design parameters, where t denotes the thickness of material added or replaced with another material, and n denotes the index of refraction of glass used in the prisms.

TABLE 1

| Design Option | Equivalent focus shift |
| --- | --- |
| ADD AIR | $t$ |
| ADD GLASS | $t/n$ |
| REPLACE AIR WITH GLASS | $t\left(\dfrac{n-1}{n}\right)$ |

TABLE 1-continued

| Design Option | Equivalent focus shift |
| --- | --- |
| REPLACE GLASS WITH AIR | $t\left(\dfrac{1-n}{n}\right)$ |

Figure 7:
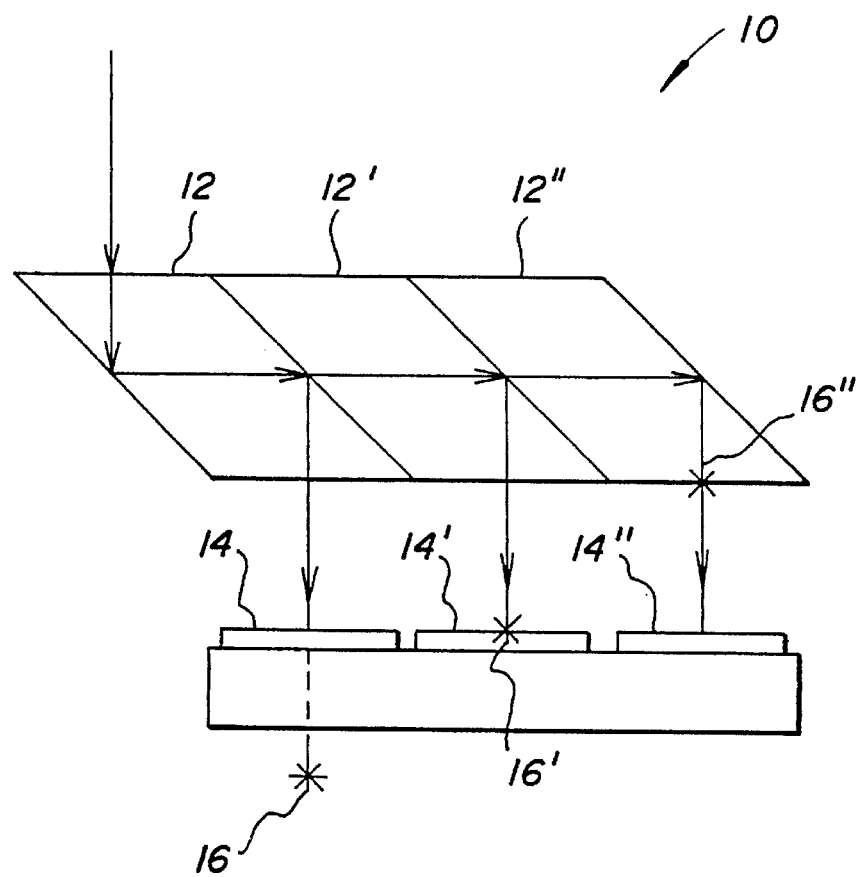
FIG. 7 shows a prior art beam splitter assembly, modified to incorporate area array image sensors in place of the original linear array image sensors.

The beam splitting clusters of this invention allow decoupling of small differential defocus and large area field coverage. This is quantitatively realized by modeling any image forming path in the invention (FIGS. 2, 4) or the referenced prior art (FIG. 7) using an optical unfolded diagram, where all reflective beam diverting surfaces are rendered absentee by "folding" the diagram about each reflective surface as the light encounters it. It is seen that in every case, each channel can be represented functionally by an entrance window of diameter S, a glass path L and air path h, a glass index of refraction n and an unvignetted image size d. These variables are related by the equation:

$$d = S - \frac{h}{F^{\#}} - \frac{2L}{\sqrt{n^2(4F^{\#2}+1)-1}},$$

where: F# is the focal ratio of the imaging beam.

Substituting real values for the prior art and the present invention, and comparing the result, reveals the aforementioned improvement realized by the present invention, namely large unvignetted area image fields are available with arbitrarily small focus differentials. The prior art does not allow for this because it intimately couples decreased field coverage with increased focus differentials.

A focus sensor of the type shown in FIGS. 4 and 5 can be made with a KAI-1001 charge coupled device (CCD) image sensor, available from the Eastman Kodak Company, Rochester, N.Y. The CCD image sensor is mated to a beamsplitter assembly made from 3 mm square beam splitting cubes available from Planar Optics Corporation, 858 Hard Road, Webster, N.Y., 14580. Focus differentials of ±0.6 mm are achieved using glass thickness differentials of 0.9 mm between the beam splitting cubes. The square, separate unvignetted fields are imaged on the sensor array which are 2.5 mm on a side. The output from the CCD image sensor separated by signal processing electronics into three 150 by 150 pixel subimages from the regions 96, 98 and 100 shown in FIG. 5.

Figure 6:
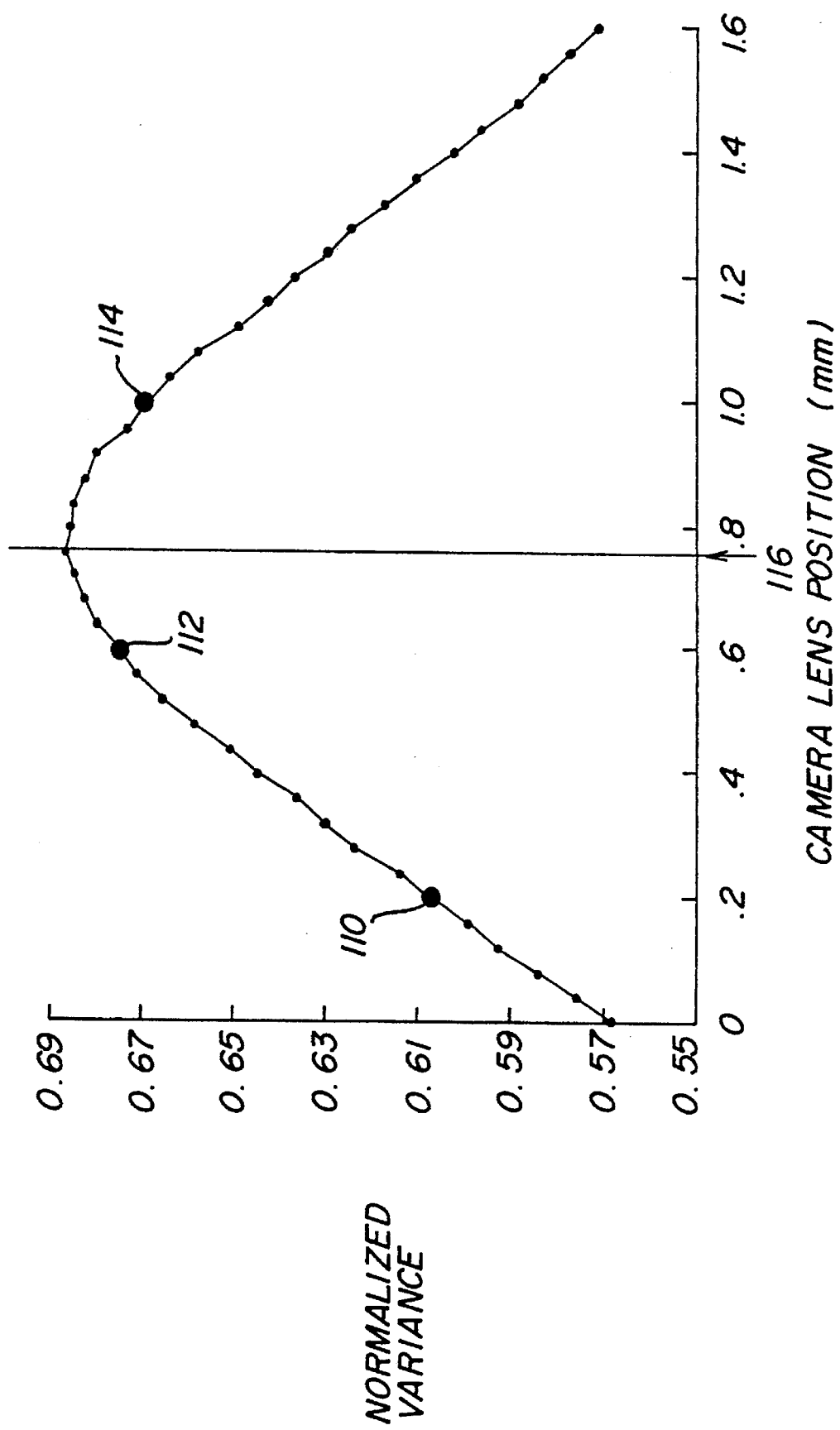
FIG. 6 is a graph showing the operation of a focus sensor according to the present invention.

A method for calculating the position of variance corresponding to the best focus setting of the optical system is illustrated by reference to the graph of FIG. 6. In this graph, the abscissa shows the domain of camera lens position settings corresponding to a laboratory experiment using a common photographic camera lens to image an object upon a two-dimensional photodetector array. The ordinate shows the measured normalized variances of the image, as the lens was set to a large number of positions. These normalized variances are computed using the standard mathematical definition of normalized variance for a number N of array element illumination readings X as follows:

$$\text{Normalized\_Variance} = \frac{N\Sigma X^2 - (\Sigma X)^2}{N^2 \bar{X}^2}$$

Normalization increases accuracy by removing effects of varying scene illumination. This real variance relationship now allows us to envision the operation of a 3-camera focus-sensing method. A beam splitter assembly of the type shown in FIG. 2 or FIG. 4, is used to sample three distinct focus positions, here shown substantially ahead, somewhat ahead and somewhat behind nominal focus, labeled graphical points 110, 112 and 114, respectively. The focus steps between the three sampled images is 0.4 mm in this example. A representative three-parameter mathematical function is computed which passes through all three measured points. Such useful functions include the quadratic, Gausssian, and Lorentzian. A unique abscissa value 116 at which the function peaks is determined to be the best focus and the lens may be set accordingly. The described functions, abscissa at peak value and normalized variance equation are all well understood in the disciplines of engineering analysis. Modern digital signal processing electronics are readily available to be encoded to execute the necessary computational steps to successfully execute this processing method.

The invention has been described with reference to a preferred embodiment. However, it will be appreciated that variations and modifications can be effected by a person of ordinary skill in the art without departing from the scope of the invention.

PARTS LIST 10 focus sensor
12 prism
12' prism
12" prism
14 sensor
14' sensor
14" sensor
16 focus position
20 generic imaging system
22 lens
24 optical axis
26 beam splitter assembly
28 image sensor
30 signal processing electronics
32 focus signal
40 beam splitting cluster
42 imaging beam
44 imaging beam
46 beamsplitter
48 beamsplitter
50 first distance
51 first mirror
52 second distance
53 extra glass thickness
54 second mirror
55 diminished glass thickness
56 third distance
58 third mirror
60 fourth distance
62 photosensitive array
64 central region
66 corner region
68 corner region
70 beam splitting cluster
71 array
72 imaging beam
73 extra glass thickness
74 optical axis
75 diminished glass thickness
76 beamsplitter
78 first beam splitting surface
80 second beam splitting surface
82 first mirror
84 second mirror 88 first distance
92 third distance
94 photosensor array
96 region
98 corner region
100 region
110–114 measured points
116 abscissa value

We claim:

1. A focus detecting system for detecting focus state of an image forming optical system relative to an object, comprising:
   a. a beam splitter assembly for forming at least three coplanar two-dimensional images of a scene, each image having a different focus setting, wherein the beam splitter assembly comprises:
      i. a first beam splitter arranged at 45 degrees to the optical axis of the optical system and perpendicular to the plane of the image sensor;
      ii. a second beam splitter parallel to the first beam splitter and spaced apart therefrom by a first distance;
      iii. a first mirror arranged parallel to the optical axis and 45 degrees to the plane of the image sensor to direct an image transmitted through the first beam splitter and reflected from the second beam splitter onto the image sensor, and spaced from the second beam splitter by a second distance;
      iv. a second mirror arranged parallel to the optical axis and 45 degrees to the plane of the image sensor to direct an image reflected from the first beam splitter onto the image sensor, and spaced from the first beam splitter by a third distance; and
      v. a third mirror arranged at 45 degrees to the optical axis and 45 degrees to the plane of the image sensor to form an image transmitted through both the first and second beam splitters on the image sensor and spaced from the second beam splitter by a fourth distance, wherein the sum of the first and second distances, the sum of the first and fourth distances, and the third distance differ by 0.4 to 4 mm;
   b. an area array image sensor for sensing the images at the image forming plane; and
   c. signal processing electronics for determining the sharpness of the three images and calculating an optimum focus setting tin the optical system by determining the variances of the three images and calculating a position of maximum variance corresponding to a best focus setting of the optical system.

2. The focus detecting system claimed in claim 1, wherein the beam splitter assembly comprises a plurality of glass prisms having partially and totally reflective surfaces.

3. A focus detecting system for detecting focus state of an image forming optical system relative to an object, comprising:
   a. a beam splitter assembly for forming at least three coplanar two-dimensional images of a scene, each image having a different focus setting, wherein the beam splitter assembly comprises:
      i. a first crossed beam splitter having first and second beam splitting surfaces arranged at ±45 degrees, respectively, to the optical axis of the optical system and perpendicular to the plane of the image sensor;
      ii. a first mirror arranged at 45 degrees to the optical axis and 45 degrees to the plane of the image sensor and spaced from the crossed beam splitter by a first distance to direct an image transmitted through the crossed beam splitter onto the image sensor;
      iii. a second mirror arranged parallel to the optical axis and 45 degrees to the plane of the image sensor and spaced from the crossed beam splitter by a second distance to direct an image reflected from the first beam splitting surface onto the plane of the image sensor; and
      iv. a third mirror arranged parallel to the optical axis and 45 degrees to the plane of the image sensor and spaced from the crossed beam splitter by a third distance to direct an image reflected from the second beam splitting surface onto the plane of the image sensor, and wherein the first, second and third distances differ by 0.4 to 4 mm;
   b. an area array image sensor for sensing the images at the image forming plane: and
   c. signal processing electronics for determining the sharpness of the three images and calculating an optimum focus setting for the optical system by determining the variances of the three images and calculating a position of maximum variance corresponding to a best focus setting of the optical system.

4. The focus detecting system claimed in claim 3, wherein the beam splitter assembly comprises a plurality of glass prisms having partially and totally reflective surfaces.

* * * * *